UNITED STATES PATENT OFFICE.

SIGMUND WILLNER, OF RAHWAY, NEW JERSEY, ASSIGNOR TO THE WILLNER WOOD COMPANY, OF SAME PLACE.

COMPOSITION OF MATTER.

SPECIFICATION forming part of Letters Patent No. 676,828, dated June 18, 1901.

Application filed December 19, 1900. Serial No. 40,441. (No specimens.)

*To all whom it may concern:*

Be it known that I, SIGMUND WILLNER, a subject of the Emperor of Germany, and a resident of and having a post-office address at Rahway, in the county of Union, State of New Jersey, have invented certain new and useful Compositions of Matter, of which the following is a full and true specification.

The object of my invention is to produce compositions of matter useful in the arts and manufactures, especially in the manufacture of imitations of or substitutes for natural materials—such as metals, bone, horn, ivory, agate, marble, onyx, mica, leather, amber, &c.—and artificial materials—such as glass, jet, gutta-percha, rubber, celluloid, enamel, porcelain, paper, &c.—and which may be readily and safely worked or manipulated in the same manner as the materials imitated or for which they are substitutes.

Gelatin or a gelatinous substance, preferably one obtained from animal tissue, constitutes the base or body of my new composition, and with this substance is mixed aldehyde or other suitable substance, which gives to the mixture the quality of insolubility, and other substances, which render the composition uninflammable and capable of withstanding atmospheric changes and variations of temperature.

Pigments or other substances for coloring, staining, bleaching, thickening, or strengthening the same may be added to the new composition, and batches or portions of differently colored, tinted, or constituted compositions may be mixed or arranged in superimposed, stratified, pitted, or other form to imitate the surface or sectional appearance of wood, bone, horn, ivory, agate, carnelian, marble, onyx, stained or ornamental glass, &c. For the purpose of making these imitations the processes employed in working celluloid, rubber, or like manufacture may be followed.

In making the preferred form of my new composition the workman dissolves or liquefies the gelatinous substance (such as animal albumin) under heat, and to the material, preferably while fluid or soft, he adds aldehyde (preferably in solution) for rendering the composition insoluble in water, and a mixture of acetate of lead, gum, and alum for rendering the resulting composition uninflammable and proof against atmospheric and temperature variations.

In practice I have found that the gelatinous or organic substance to constitute the base or body of the composition may be heated or boiled in a steam-jacketed pan until thoroughly dissolved, a small quantity of water— say ten parts—being added to facilitate boiling and to prevent burning. When the gelatinous substance is thoroughly dissolved, the aldehyde or other material for rendering the composition insoluble is added. For this purpose I prefer a solution containing from two to ten per cent. of aldehyde in water, the mixture being thoroughly stirred before solidification. Pigments or other coloring, staining, or bleaching matters or other ingredients, according to the articles to be made, are mixed with the composition, preferably while hot and soft or fluid, until the whole mass is thoroughly incorporated. The aldehyde is preferably added after the pigments or other ingredients (if employed) have been incorporated. The relative proportions of aldehyde and water or other substance in the aldehyde solution may be varied to suit the requirements. As an instance I have secured good results in the manufacture of imitation ivory when I employ a two-per-cent. aldehyde solution.

In order to adapt the composition to withstand atmospheric and temperature variations without cracking or breaking, the workman adds to the mass (while still hot) a suitable substance or substances—such as a mixture of acetate of lead, gum, and alum, (preferably in substantially equal quantities and in the proportion of about three parts of each ingredient to one hundred parts of the gelatinous composition)—and the material is thoroughly incorporated in the mass by stirring.

A composition, either flexible or stiff, made in accordance with my invention is non-inflammable, insoluble in water, and will not be injured, softened, or cracked by ordinary atmospheric changes or by dry or cold air. The harder forms may be worked with tools or machinery into many articles, to which when desired a high polish or finish may be imparted.

To further protect the composition from the effects of atmospheric and temperature variations, masses thereof or articles produced therefrom may be dipped in or coated, painted, or varnished with substances adapted to resist hot and cold air and dampness. Suitable substances are a mixture of paraffin with a solution of gutta-percha dissolved in benzolin or a mixture of asphalt and gutta-percha.

In order to soften my new composition, solvents may be employed to act alone or with or after the use of heat, and the softened composition can be manipulated under pressure, if desired, in conjunction with heat in many ways—for instance, being forced through a nozzle or open plate to form rods or tubes.

When the resulting compound is to be of excessive hardness to be turned in a lathe or otherwise machined for the production of buttons, golf-balls, cane-handles, tool-holders, &c., and especially for long or large articles, the workman adds to the composition, preferably while plastic or semisoft, a mixture or solution of casein, quicklime, and gutta-percha or other hardening material, and the composition or article made therefrom is then preferably allowed to slowly dry in a closed compartment at a temperature of, say, 70° Fahrenheit.

I do not desire to be understood as confining my invention to solid or plastic compositions.

My new composition may be produced in fluid and semifluid conditions for use as paints or varnishes or substitute therefor. For this purpose the proportion of gelatinous substance (the animal tissue, for instance) may be increased and the mixture is heated, (preferably to 110°.) The aldehyde solution (preferably a solution of eight or ten per cent.) is added when the gelatinous base or body has been thoroughly boiled. The result is a fluid or semifluid composition which may be applied to a base as a paint or varnish and which when dry becomes a solid and very durable film or sheet.

A composition made under my invention may be applied to cloth, leather, or other pliable or stiff material, (either as a coating or by saturation,) and the resulting article, sheet, or strip may be used for many purposes in the arts, such as book-covers, belts, collars, cuffs, &c.

My new composition is an excellent one for insulating electrical apparatus or conductors and may be used in the same ways as other insulating materials.

While I have hereinbefore referred to specific mixtures and specific proportions of the ingredients, yet I do not desire to be understood as limiting my invention thereto, nor do I desire to be understood as limiting my invention to the use of the particular ingredients. In place of or in addition to the aldehyde other substance or material for giving like properties to the mixture may be employed, and in conjunction with or as a substitute for the mixture of acetate of lead, gum, and alum other material for rendering the composition uninflammable and temperature-resisting may be employed. Obviously the mixtures and properties will be varied to suit the requirements of each particular case, the experience or judgment of the skilled workmen being relied on.

What I claim is—

1. A new composition, consisting of an insoluble gelatinous mass or body in combination with acetate of lead, gum and alum, for rendering the mass resistant to atmospheric and temperature variations.

2. A new composition, consisting of an insoluble gelatinous mass or body containing aldehyde, in combination with acetate of lead, gum and alum, for rendering the mass resistant to atmospheric and temperature variations.

3. A new composition, consisting of an insoluble gelatin mass or body, containing material for rendering the mass resistant to atmospheric and temperature variations, and an applied coating consisting of a mixture containing gutta-percha.

4. A new composition consisting of a gelatinous mass or body, and of materials, substantially such as described, thoroughly incorporated therewith, for rendering the mass insoluble in water, together with acetate of lead, gum and alum, for rendering the mass resistant to atmospheric and temperature variations.

5. A new composition, consisting of an insoluble gelatinous mass or body, and an applied protective coating consisting of a mixture of paraffin and gutta-percha.

6. A new composition, consisting of an insoluble gelatinous mass or body, and an applied protective coating consisting of a mixture containing gutta-percha.

In witness whereof I have hereunto signed my name this 4th day of December, 1900.

SIGMUND WILLNER.

In presence of—
GEORGE WILLIAM BURLEIGH,
WILLIAM TUCHS SEAMAN.